United States Patent [19]

Berthold et al.

[11] 4,291,892

[45] Sep. 29, 1981

[54] SNOW VEHICLE

[75] Inventors: Gert Berthold; Dieter Dreyhaupt; Helmfried Dunse; Erich Henker; Bernd Viehweg, all of Karl Marx Stadt, German Democratic Rep.

[73] Assignee: VEB Wissenschaftlich-Technisches Zentrum Automobilbau, Karl Marx Stadt, German Democratic Rep.

[21] Appl. No.: 68,715

[22] Filed: Aug. 22, 1979

[30] Foreign Application Priority Data

Sep. 28, 1978 [DD] German Democratic Rep. ... 208102

[51] Int. Cl.³ .................................................. B62M 27/00
[52] U.S. Cl. ..................................... 280/28; 180/182; 244/108
[58] Field of Search ........................ 280/16, 21 R, 28; 180/182, 183; 244/108

[56] References Cited

U.S. PATENT DOCUMENTS

| 3,014,731 | 12/1961 | Dworak | 280/16 |
| 3,643,979 | 2/1972 | Richards | 280/28 |
| 3,967,692 | 7/1976 | Hoffman | 180/182 X |

FOREIGN PATENT DOCUMENTS 461970  2/1915  France .......................... 180/182

Primary Examiner—Joseph F. Peters, Jr.
Assistant Examiner—Michael Mar
Attorney, Agent, or Firm—Michael J. Striker

[57] ABSTRACT

A snow vehicle has an undercarriage provided with two runners. The vehicle is of the type which operates on an incline under gravity, i.e. of the sled-type. The runners are spring mounted on the vehicle and an arrangement is provided for horizontally guiding the runners and in particular preventing their breaking-out in lateral direction. The arrangement has a long spring stroke but is of low overall construction and has a flat spring characteristic.

6 Claims, 5 Drawing Figures

SNOW VEHICLE

BACKGROUND OF THE INVENTION

The present invention relates generally to a snow vehicle, and more particularly to a two-tracked snow vehicle.

Still more specifically, the present invention relates to a snow vehicle having two runners and operating on gravity, i.e. a vehicle of the sled type.

Snow vehicles of this type are already known, having two runners which are directly mounted on the body of the vehicle so that they can turn relative to the same about a transverse axis in order to accommodate themselves to any unevenness of the track. The axis is provided with radially and axially acting slide bearings at its ends and the carrier of the respective runner is connected with the hub of the bearing. The runner itself is in turn connected to the carrier. The vertically acting forces resulting during operation of the vehicle are directly transmitted to the hub of the bearings and from there to the axis, i.e. the shaft defining the axis. It is a disadvantage of this construction that the carrier forms with the runner, due to the fixed connection with the same via the screws or the like, an essentially rigid assembly which can yield elastically only to an at most insignificant extent in vertical and horizontal direction.

Two further proposals were made in German Published Application No. DE-OS 2 407 190 and in German Allowed Application No. DE-AS 2 044 433; however, neither of these proposals is entirely satisfactory in terms of construction and of the performance of the vehicle.

SUMMARY OF THE INVENTION

It is, accordingly, an object of the present invention to provide an improved snow vehicle which offers substantial advantages over those known from the prior art.

A more particular object is to provide, in such a snow vehicle, an undercarriage construction which is of relatively low height, thus permitting the vehicle to have a low center of gravity, but which has a springy suspension for the body of the vehicle.

A concomitant object of the invention is to provide such an undercarriage in which the runners are laterally guided and wherein a flat spring characteristic is obtained over at least the larger part of the spring compression and expansion path.

In keeping with the above objects, and with others which will become apparent hereafter, one feature of the invention resides, in a snow vehicle, in an undercarriage which comprises a pair of elongated runners each having a leading end portion, a trailing end portion, and a mid portion therebetween. An arm is provided on each runner and has one end section pivoted to the leading end portion of the runner on a transverse pivot axis, another end section above the nip portion and a mounting part depending from the arm intermediate end sections. A link member has spaced ends pivoted to the mounting part and to the trailing end section of the runner, respectively. Resiliently yieldable biasing means is interposed between and coacts with the link member and the other end section of the arm, respectively.

Preferably, the biasing means may be in form of a helical spring, and the mid-portion of each runner may be in form of two upstanding projections each extending into a respective pocket formed on the associated arm and within which an additional biasing means is provided. A torsion spring may be interposed between each runner and the body of the vehicle and a shock absorber may be connected between the other end section of the arm and the associated link member.

Due to the just-outlined construction a long spring stroke is obtained and at the same time a flat spring characteristic. The spring characteristic rises progressively if the auxiliary biasing means mentioned above is provided, and the undercarriage is thus able to withstand even very high loads as long as they are of brief duration. The fact that the projections extend into the pockets assures proper lateral guiding of the runners with reference to the remainder of the undercarriage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 2:
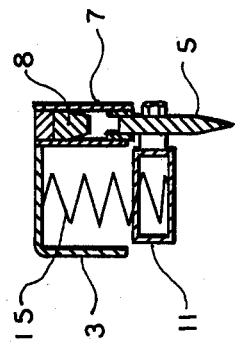
FIG. 2 is a fragmentary section taken on line II—II of FIG. 1.
Figure 1:
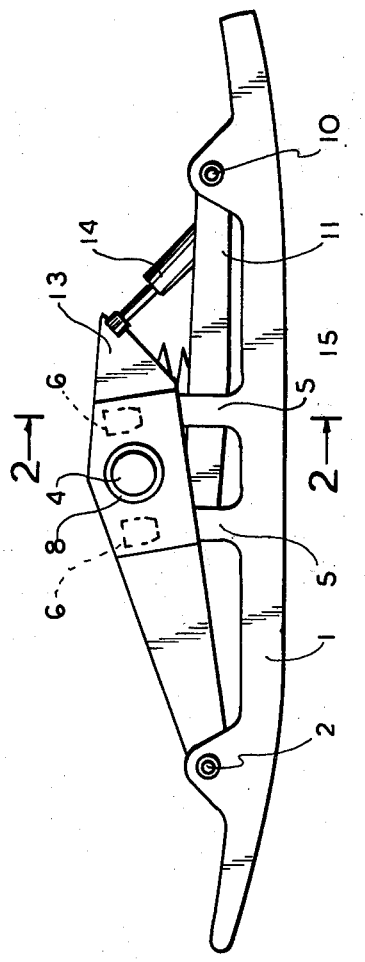
FIG. 1 is a somewhat simplified side view of an undercarriage according to the present invention.
Figure 3:
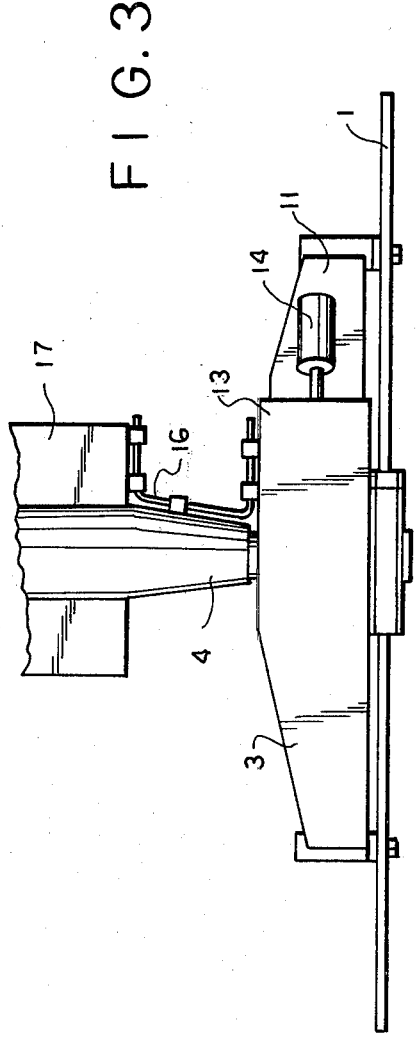
FIG. 3 is a fragmentary top-plan view of FIG. 1.

Referring firstly to FIGS. 1-3 it will be seen that an undercarriage for a snow vehicle is illustrated, with the snow vehicle being only shown in part in FIG. 3 and with only one runner and associated elements of the undercarriage being visible, it being understood, however, that the arrangement is symmetrical so that a second arrangement identical to the one in FIG. 1 will be located behind the illustrated arrangement (and hence not visible).

Each runner arrangement of the undercarriage according to the present invention has an elongated runner 1 and an arm 3 which is pivoted to the leading end portion of the runner 1 on a pivot axis 2 extending transverse to the elongation of the runner. The arm is preferably constructed as a box-shaped profile (compare FIG. 2) and its other end portion has mounted in it a shaft 4. The center of the pivot shaft 2 is located lower than the center of the pivot shaft 4, as is readily evident from FIG. 1. The mid-portion of the runner 1 is provided with two upstanding projections 5 the upper ends of which extend into pockets 7 formed in the arm 3 (see FIG. 2). The projections 2 are slidable in the pockets 7 so that they can enter into the same to a greater extent than is illustrated in FIG. 2. The spacing of the projections 5 from one another is greater than the diameter of a hub 8 for the shaft 4, which is provided on the arm 3. This spacing is required in order to obtain a large spring stroke while still being able to provide for a low overall height of the arrangement. At opposite sides of the hub 8 there are provided, located in the respective pockets 7 (only one visible) a pair of auxiliary biasing springs 6, here illustrated in form of members of elastomeric material (e.g. rubber or synthetic plastic). These are engaged by the upper ends of the projections 5 when the latter enter deeply enough into the pockets 7. The two biasing means 6 are compressed under such circumstances, to an approximately equal extent by the two projections 5. The pockets 7 have the additional purpose of laterally guiding the projections 5 and hence the runner 1.

Forwardly or rearwardly of the axis defined by the shaft 4 the arm 3 is provided with a depending part 12 (see FIG. 4) to the free end of which is pivoted a link member 11, the other end of which is pivoted at 10 to the trailing end section of the runner 1. The free end of arm 3 is identified with reference numeral 13 and has secured to it one end of a shock absorber 14 the other end of which is connected to the link member 11. In the general vicinity of the hub 8 a biasing means is provided, in form of a helical spring 15 which reacts between the end portion 13 and the link member 11. The spring 15 and the shock absorber 14 are so mounted between the end portion 13 and the link member 11 that they make maximum use of the space available between the lower edge of the link member 11 and the upper edge of the end portion 13; the space available for the spring 15 is reduced only by the thickness of the material of the link member 11 (of sheet metal) and of the end portion 13 (also of sheet metal) of the arm 3.

This construction assures a large spring stroke for the spring 15, which spring stroke is limited in the direction of compression by eventual compression of the auxiliary biasing means 6 and in the direction of expansion of the spring 15 by the presence of the shock absorber 14. Because of the desire to have the construction be as low as possible the shock absorber 14 cannot be mounted vertically or even near-vertically; however, despite this its arrangement as chosen and illustrated in the drawing is such that it produces the maximum possible vertical component and is thus able to absorb small inner forces within the undercarriage. The position of the runners with reference to the body of the vehicle is determined by the presence of a torsion spring 16 (there is one provided in connection with each of the runners) which is connected to the end portion 13 of the arm 3 and to a portion 17 of the vehicle in which the shaft 4 is mounted. However, the spring 16 could also be mounted directly on the arm 3 (other than on the end portion) and directly on the vehicle body. The purpose of the two torsion springs 16 is to assure that whenever a runner 1 lifts off the track surface it will always automatically return to its normal rest position from whatever position it was in at the time of losing contact with the track surface.

Figure 4:
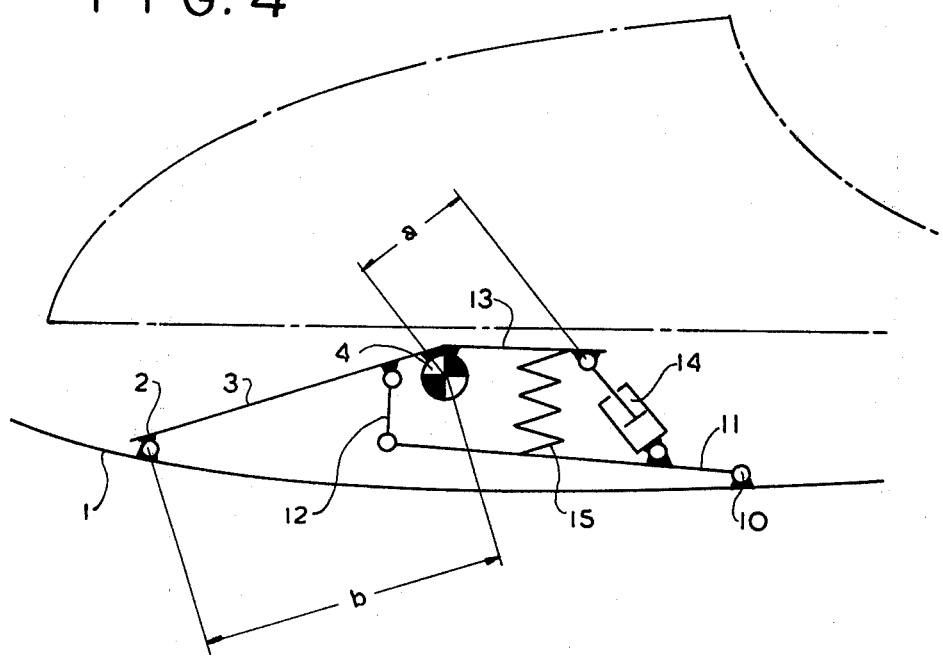
FIG. 4 is a diagram showing the kinematic relationships of the embodiment in FIGS. 1-3.

As is shown in FIG. 4, the runner 1 has two degrees of freedom in its movement relative to the axis defined by the shaft 4. The first degree of freedom is determined by the turnable mounting of the entire runner arrangement on the shaft 4, which permits the runner to adjust itself to angular deviations between the longitudinal axis of the vehicle body and the upper surface of the snow track. The second degree of freedom is defined by a couple which is formed by the arm 3, the depending part 12 and the link member 11. The spring 15 and the shock absorber 14 are arranged between the end portion 13 of the arm 3 and the link member 11 so that the spring 15 has an advantageous transmission factor, inasmuch as during entry of the projections 5 into the pockets 7 both the pivoting of the arm 3 and the pivoting and shifting of the link 11 become effective as part of the spring action. To obtain a maximum effective component of operation from the shock absorber 14 in the spring direction of the runner, it is advantageous if the distance a (see FIG. 4) is equal to at least a quarter (up to a third) of the distance b.

Figure 5:
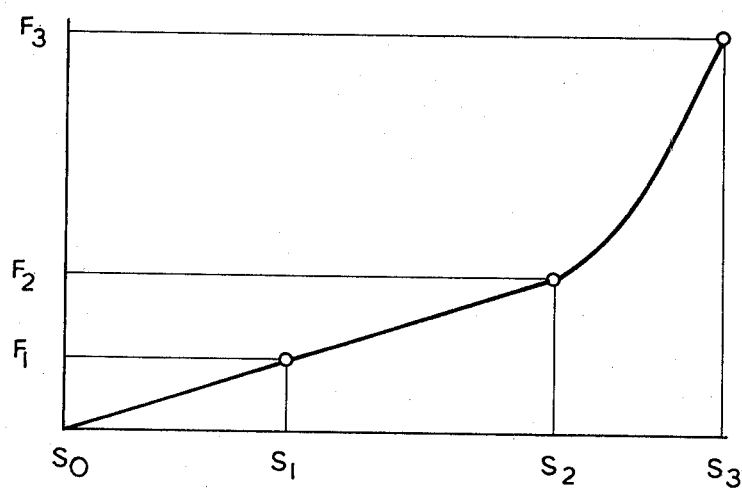
FIG. 5 is a diagram showing the spring characteristic of this embodiment.

The diagram in FIG. 5 shows the spring force F plotted against the vertical displacement of the runner. At the static force $F_1$ the projections 5 have entered into the pockets 7 to the extent designated by $S_1$. When the spring force increases to $F_2$ (e.g. because the vehicle travels over a bump or other unevenness of the track, or because of the centrifugal force during travel around a curve) the projections 5 enter deeper into the pockets until the position $S_2$ is reached, and at this point the compression of the auxiliary biasing means 6 begins. Because of the progressive increase of the spring force these auxiliary biasing means 6 then limit the spring force to $F_3$ and the further entry of the projections 5 into the pockets 7 to $S_3$.

The spring 15 and the auxiliary biasing means 6 should be so dimensioned that the distance from $S_0$ to $S_1$ (FIG. 5) is approximately equal to one-quarter up to one-third of the distance between $S_1$ and $S_3$.

In operation, when a vehicle provided with the undercarriage according to the present invention travels over a bump or other unevenness of the track, then the respective runner 1 will first lift at its leading end so that the arm 3 tilts upwardly and turns on the shaft 4. At the same time the end portion 13 tilts downwardly and compresses the spring 15 as well as the shock absorber 14. During further travel of the runner over the bump it is raised at its center and subsequently at its trailing end, so that the link 11 also is displaced upwardly and compresses the spring 15 and the shock absorber 14 additionally.

After the runner 11 has cleared the bump the pivot 2 will be the first to move downwardly and in the now following phase, in which the force acting on the runner is initially somewhat above the static value, the vehicle with the shaft 4 pivots about the pivot 2 forwardly and upwardly and an impulse is transmitted to the vehicle, having a component in the direction of advancement of the vehicle. This component is the greater, the deeper the pivot 2 is located with reference to the shaft 4. This movement is comparable to the action of a cross-country skier who pushes forwardly and upwardly from the ski on which he temporarily has his body weight resting.

The soft spring arrangement in the construction according to the present invention assures that when the projections 5 enter into the pockets 7 because of a bump in the track the force acting on the load is increased only slightly, whereas if the projections 5 move outwardly of the pockets 7 as the runner 1 moves over a depression in the track and drops away, the load on the runner is decreased only slightly. The forces acting between the runner 1 and the track thus change only very slightly, and in particular no force peaks develop which could damage the track. Since damage to the track resulting from such force peaks which are common in the prior art, leads to a corresponding loss of energy and of speed, it follows that the spring arrangement according to the present invention has a favorable influence upon maintenance of the vehicle speed because the force peaks are avoided. Of course, avoidance of the force peaks also implies, as outlined above, an elimination of damage to the track, which is a further advantage.

The division of the spring stroke, in conjunction with the soft spring arrangement, assures that the runner can glide over bumps as well as depressions in the track without lifting off the track, respectively without jumping. Since lifting of the runner or jumping eliminates temporarily the gravitational effect resulting from gliding on the track, the vehicle would lose some of its speed in downward direction relative to the incline over which it travels under the influence of gravity. A corresponding conversion of the vertical component of speed resulting as the vehicle comes down again upon the track after a jump, does not take place because too much energy is destroyed during the initial jumping and during the subsequent re-contacting of the track. Because of the present invention, however, the lift-off and jumping problem is avoided, so that consequently the loss of speed is also avoided.

While the invention has been illustrated and described as embodied in a snow vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a snow vehicle, an undercarriage comprising, in combination, a pair of elongated runners each having a leading end portion, a trailing end portion, and a mid-portion therebetween and having an upright part; an arm on each runner and having one end section pivoted to the leading end portion of the runner on a transverse pivot axis, another end section above said mid-portion and having a pocket into which said upright part extends with clearance, an intermediate section between said end sections, and a mounting part depending from said intermediate section; a link member having spaced ends pivoted to said mounting part and to the trailing end section of the runner, respectively; and resiliently yieldable biasing means interposed between and coacting with said link member and said other end section of the arm, respectively.

2. A combination as defined in claim 1, wherein said biasing means comprises a helical spring.

3. A combination as defined in claim 1, said upright part being composed of two separate projections each extending into a different section of said pocket.

4. A combination as defined in claim 1; further comprising resilient means in said pocket and operative to coact with said arm and said upright part in response to entry of the latter into said pocket beyond a predetermined extent.

5. A combination as defined in claim 1; and further comprising a torsion spring on said other end section of said arm and connectable to a part of a vehicle body.

6. A combination as defined in claim 1; and further comprising a shock absorber acting between said other end section of said arm and said link member, respectively.

* * * * *